Patented Feb. 3, 1948

2,435,544

UNITED STATES PATENT OFFICE 2,435,544

METHOD OF NITRATING ORGANIC COMPOUNDS

Vaman R. Kokatnur, New York, N. Y., assignor to Autoxygen, Inc., New York, N. Y., a corporation of New York No Drawing. Original application December 5, 1940, Serial No. 368,614. Divided and this application April 16, 1947, Serial No. 741,935

8 Claims. (Cl. 260—645)

This invention relates to a method of nitrating organic compounds and particularly aromatic organic compounds.

This application is a division of my application Serial No. 368,614, filed December 5, 1940, "Method of nitrating organic compounds."

The nitration of organic compounds is one of the most important unit processes and plays an important part in the dyestuff industry and the manufacture of explosives. Water is a product of the reaction of the nitration process and unless this water is removed, the reaction approaches an equilibrium before completion. Many attempts have been made to remove this water by chemical combination and thus to prevent an equilibrium being produced, so that the reaction would be continued. The most successful of such attempts and the one now commonly in use is to provide concentrated sulphuric acid in the zone of the reaction to absorb the water produced. The sulphuric acid is mixed with nitric acid in certain definite proportions, depending upon the particular materials used, and this mixture of nitric and sulphuric acids is referred to in the art as "mixed nitrating acid."

For mononitration the proportion of nitric in the mixed acid generaly does not exceed 33%. For higher nitration the proportion of nitric acid becomes smaller and smaller and may be as low as 3 to 5% with consequent increases in the amount of sulphuric acid. The increased proportion of sulphuric acid is necessary to combine with the larger amount of water evolved during these particular reactions. Thus the mixed acid requires a certain distribution of the two acids depending upon the particular nitration reaction involved before it can be used for that reaction.

It is well known in the art that the speed of nitration of an organic compound is directly proportionate to the concentration of nitric anhydride, or $N_2O_5$, which is nitric acid without any water. It will thus be seen that nitration reactions using mixed acids are at best inefficient, since the proportion of nitric acid in the mixture of acids is a minor fraction.

Furthermore, it has not been possible heretofore to remove the water of reaction from the zone of reaction. This I have found to be a serious disadvantage, particularly in producing side reactions.

The presence of relatively high temperature boiling sulphuric acid produces the further disadvantage that it superheats the reaction mixture because of the exothermic heat evolved during the reaction. While some means for cooling the mass is generally used, it has been found impossible to distribute the exothermic heat molecularly throughout the mass to prevent superheating. The effect of superheating the mass is to produce higher nitrations as well as to cause oxidation which gives rise to serious hazards of explosion because of the sensitivity of the reaction mixture.

It is, therefore, a primary object of the present invention to provide a process of nitration which will not have any of the disadvantages mentioned above and by means of which water may be removed from the zone of reaction without the necessity for using sulphuric acid.

Another important object of the invention is to provide a process of nitration by means of which nitro-compounds may be produced more economically than has been possible heretofore.

Another object of the invention is to provide a process for producing purer nitro-compounds, particularly purer polynitro-compounds with better yield than has heretofore been known.

Another object of the invention is to provide a safer nitration process than has heretofore been used.

Still another object of the invention is to provide a process of nitration by which the reaction temperature may be controlled so as to reduce the effect of local superheating.

A further object of the invention is to provide a nitration process which will reduce superheating of the reaction mass, caused by exothermic evolution of heat, by distributing this heat molecularly throughout the entire reaction mass.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

I have discovered that the above mentioned objects may be attained and the disadvantages found in processes of the prior art reduced or eliminated by carrying on the reaction of nitration in combination with a diluent which is substantially inert to the reacting materials, is substantially immiscible with water, has a suitable boiling point, and is preferably a solvent of the compound to be nitrated as well as the product of nitration.

In carrying out the process the diluent is mixed with the particular material to be nitrated and the nitrating agent, and the temperature adjusted until the mixture begins to boil. A diluent with a boiling point approximating the desired reaction temperature is selected, so that by maintaining the mixture at the boiling point the reaction will be carried on and at the same time water evolved by the reaction or present in the mixture will distill out with the diluent.

This water may be carried off with the diluent in acocrdance with the principle of partial pressure distillation. By this I mean that the vapor pressures of water and the diluent are sufficient together to overcome the external pressure, thus permitting the water to vaporize at a temperature under that normally required as a result of the azeotropic mixture formed. As distillation takes place, the water is removed as it is evolved, together with the diluent, and the process is carried on until the reaction is completed.

Suitable diluents, which may be used for my purpose, are saturated hydrocarbons of the aliphatic series; cycloparaffins; nitroparaffins; other organic compounds that do not react with the nitrating agent, including ethers, such as dibutylether and isopropylether, esters, such as methyl acetate, ethyl formate, methyl nitrate, ethyl nitrate, and propyl nitrate, and aliphatic chlorine compounds, such as chloroform, dichloroethylether and carbon tetrachloride; aromatic hydrocarbons (when used in excess only); and aromatic nitro-compounds (for nitrations of the same order only).

Certain practical considerations are important to mention in connection with carrying out my invention. Generally speaking, nitration operations are carried on at temperatures ranging from room temperatures to those as high as 130° C. Polynitro-compounds explode at temperatures higher than 175° C. For this reason I prefer to use diluents, the end boiling points of which do not exceed about 175° C. As the reaction is to be carried on at the boiling point of the diluent in order to remove the water from the zone of reaction, the ratio of the amount of diluent to that of water removed may be inordinately high in cases where the diluent boils at or below the temperature of reaction. To avoid this, I may use a diluent that normally boils higher than the reaction temperature and make it boil at the temperature of reaction by reducing the pressure. In such a case, I may use diluents that normally boil as high as 200° C. or even higher. It should be definitely understood, however, that no diluent which boils above 150° C. at a pressure of 29 inches of mercury (atmospheric pressure), should be used at that pressure.

By carrying on the reaction at a temperature at which the diluent and water will vaporize together, the temperature of reaction can be automatically regulated and the water evolved by the reaction progressively removed, as it is formed, from the zone of reaction by distillation.

The diluent further acts as a safety valve and as a medium of molecular cooling in the distribution of exothermic heat evolved during all nitration reactions. Since the reactant as well as the product is preferably soluble in the diluent, any heat evolved during the reaction is distributed throughout the mass of the solution. If the reaction mass becomes too hot, the diluent will boil off vigorously and thus give an indication that the reaction is going too fast.

The nitro-compounds in general have acidic properties and the larger the number of nitro-groups in the compound, the greater will be the acidity. Because of the acidity of these compounds, salts are formed with metals for bases. These salts are very sensitive and are looked upon as the primary cause of the explosions of many nitro-compounds. In the production of explosives such as T. N. T. (trinitrotoluol) or picric acid (trinitrophenol), special metal is used in the apparatus for carrying out nitration reactions so that the formation of salts may be avoided. With the reaction processes using mixed acids, water is present in the zone of reaction although it is combined with sulphuric acid. Nitro-compounds ionize in water and this ionization is responsible to a large extent for the formation of salts. The organic diluent used in my process plays an important part in inhibiting ionization of the nitro-compound, because that compound is in a solution in the diluent which is a non-polar and non-ionizing solvent. This is another reason why my process has greater safety than those heretofore used.

Of course, by not using sulphuric acid in my process, I completely eliminate the necessity for recovering the spent acid and the attendant many washings and neutralizations that must be carried on to use this acid over again. Economies in the use of raw materials and handling are thus affected.

In order to illustrate my invention the following examples are given:

*Example I (nitronaphthalene)*

Approximately 1,280 parts of naphthalene are dissolved or suspended in about 2,000 parts of petroleum ether, which has a boiling point of between 30° and 60° C. and which represents the diluent in this example. To this mixture about 1,000 parts of 50% nitric acid or the equivalent of any other per cent concentration is added. The mixture is placed in a distilling vessel fitted with a reflux condenser column, an agitator, and a water trap. The distilling vessel is then heated in any desired manner until the petroleum ether begins to boil and pass off as vapor, carrying the water with it. The heating is continued until all the free water as well as the water of nitration is trapped in the water trap. The reaction is considered complete when the amount of water trapped is approximately the same as the amount theoretically calculated to be evolved in the reaction plus that originally present.

When the mass is allowed to cool, the product, alpha nitronaphthalene, crystalizes out from the petroleum ether solution. If the nitric acid used is sufficient to convert all the naphthalene into nitronaphthalene, no free naphthalene will be found in the reaction product which will consist primarily of alpha nitronaphthalene and petroleum ether. The nitronaphthalene may be purified and recovered in any conventional manner.

*Example II (m-dinitrobenzene)*

Approximately 1,230 parts of mononitrobenzene, are mixed with about 1000 parts of a saturated hydrocarbon of the petroleum series, boiling between 100 and 120° C. which acts as the diluent. To this mixture is added approximately 630 parts of 100% nitric acid or an equivalent amount of nitric acid of any other concentration. The mixture is placed in a distilling vessel fitted with a reflux condenser column, an agitator, and a water trap. The mixture is heated in any conventional manner and agitated until the diluent begins to boil off carrying the water with it. The temperature is held substantially constant to boil the hydrocarbon and water together. The reaction is continued until all the water of reaction as well as any water of dilution, if any, is collected in the trap. The reaction is then considered complete, since substantially all the nitric acid is used up in the nitration, and there remains one layer of m-dinitrobenzene in the diluent. The m-dinitrobenzene may be crystallized out from solution or may be separated by boiling off the diluent, or in any other conventional manner. The melting point of the m-dinitrobenzene is between 83 and 85° C. The product thus produced is purer than the product produced by other known processes.

*Example III (trinitrotoluene)*

About 460 parts of toluene, about 1000 parts of nitric acid of 95% concentration, or the equivalent amount of any other concentration, and about 1500 parts of benzene or light gasoline are placed in a still fitted with an agitator, and a reflux watertrap. The still is heated and the mixture agitated until the diluent, the benzene, carrying water with it, begins to reflux. The reaction is continued until all of the free water and that liberated by the reaction is collected in the water trap. When this happens the nitric acid layer has all disappeared and is completely absorbed. This is considered the end of the reaction. On cooling trinitrotoluene crystallizes out. However, it is preferable to wash the solution with hot water or hot alkaline solution and then evaporate the dry solution to crystallize the bulk of the trinitrotoluene. The mother liquor containing the residual trinitrotoluene may be used for the next operation as a diluent. By this procedure very pure trinitrotoluene is obtained. If this is not desired, all the diluent may be removed by evaporation, leaving trinitrotoluene residue which may be treated in any conventional manner. If high boiling diluents are used, the reaction should be conducted in sufficient vacuum so that the diluent boils at a temperature not to exceed 100° C. Preferred reaction temperature is between 80° and 90° C. Yield is of the order of 90% of that calculated theoretically.

In all examples the diluent returns to the reaction vessel owing to its condensation in the reflux condenser. As it vaporizes, however, it constantly carries the water away from the zone of reaction and allows it to collect in the trap. It is also to be clearly understood that all the reactions in all of the examples are carried on with agitation.

Since certain changes may be made in carrying out the above method without departing from the scope of the invention, it is intended that all matter contained in the above description will be interpreted as illustrative and not in a limiting sense.

It is also to be understood that the following claims are intended to cover all the generic and specific features of the invention herein described, and all statements of the scope of the invention which as a matter of language might be said to fall therebetween.

Having described my invention, what I claim as new and desire to secure by Letters Patent is:

1. The process of nitrating an organic nitratable compound which consists in mixing said nitratable compound with a nitrating agent consisting of nitric acid and a water immiscible diluent substantially inert to the reacting materials and the reaction product, said diluent having a boiling point exceeding that of the nitrating reaction temperature and being capable of forming an azeotrope with water which is vaporizing at the temperature and pressure conditions of the nitrating reaction, the amount of said diluent being sufficient to substantially remove water present in the mixture and that evolved by the reaction, heating the mixture at a reduced pressure and corresponding temperature for nitrating said nitratable compound and vaporizing the azeotrope to remove the water present and evolved.

2. The process of nitrating an organic nitratable compound which consists in the steps of mixing said nitratable compound with a nitrating agent consisting of nitric acid and an organic diluent substantially inert to the reacting materials and the reaction product, said diluent being substantially water immiscible and capable of forming an azeotrope with water, the amount of said diluent being substantially sufficient to remove any water present in the mixture and also any water evolved by the reaction, said azeotrope being vaporizable at the temperature and pressure conditions of the nitrating reaction, and heating the mixture to vaporize the azeotrope formed at approximately the temperature of the reaction.

3. The process of nitrating an organic nitratable compound which consists in the steps of mixing said nitratable compound with a nitrating agent consisting of nitric acid and a water immiscible organic diluent substantially inert to the reacting materials and the reaction product, said diluent having a boiling point approximately equal to that of the nitrating reaction and being capable of forming an azeotrope with water which is vaporizable at the temperature and pressure conditions of the nitrating reaction, the amount of said diluent being sufficient to substantially remove water present in the mixture and that water evolved by the reaction, agitating and heating the mixture at a temperature and under conditions which will nitrate said nitratable compound and vaporize the azeotrope for removing the water present and evolved.

4. The process of nitrating an organic nitratable compound which consists in the steps of mixing said nitratable compound with a nitrating agent consisting of nitric acid and a water immiscible organic diluent substantially inert to the reacting materials and the reaction product, said diluent having a boiling point not exceeding 150° C. at atmospheric pressure and being capable of forming an azeotrope with water which is vaporizable at the temperature and pressure conditions of the nitrating reaction, the amount of said diluent being sufficient to substantially remove water present in the mixture and that evolved by the reaction, agitating and heating the mixture at a temperature and under conditions which will nitrate said nitratable compound and vaporize the azeotrope for removing the water present and evolved.

5. The process of nitrating an organic nitratable compound which consists in the steps of mixing said nitratable compound with a nitrating agent consisting of nitric acid and a water immiscible organic diluent substantially inert to the reacting materials and the reaction product, said diluent having a boiling point not exceeding 150° C. at atmospheric pressure and being capable of forming an azeotrope with water which is vaporizable at the temperature and pressure conditions of the nitrating reaction, said diluent being a solvent for the reagents and the product of nitration, the amount of said diluent being sufficient to substantially remove water present in the mixture and that evolved by the reaction, agitating and heating the mixture at a temperature and under conditions which will nitrate said nitratable compound and vaporize the azeotrope for removing the water present and evolved.

6. The process of producing m-dinitrobenzene consisting of the steps of mixing a quantity of benzene, an amount of a nitrating agent consisting of nitric acid theoretically required to produce the desired dinitro-compound from the said quantity of benzene and a saturated hydrocarbon of the petroleum series having a boiling point between 100° and 120° C., said hydrocarbon forming an azeotrope with water which is vaporizable at the temperature of the nitrating reaction, heating the mixture to nitrate said benzene and vaporize the azeotrope until the water evolved by the reaction and also any water present in the mixture is removed to produce the desired dinitro-compound, and isolating the dinitro-compound free from the diluent and any un-reacted nitric acid.

7. The process of producing nitronaphthalene consisting of dissolving naphthalene in a water immiscible hydrocarbon diluent boiling between 30° and 60° C. which is inert to the reactants, said diluent being capable of forming an azeotrope with water vaporizable at the temperature and pressure conditions of the nitrating reaction, the amount of said diluent being sufficient to remove water present in the mixture and that evolved by reaction, adding a nitrating agent consisting of nitric acid to the mixture and heating the same at a temperature and under conditions to nitrate said naphthalene and to vaporize the azeotrope formed for removing the water present and evolved.

8. The process of producing trinitrotoluene consisting of mixing toluene with a nitrating agent consisting of nitric acid and a light volatile hydrocarbon, the amount of said nitric acid being sufficient to provide the said product, said hydrocarbon being capable of forming an azeotrope with water which is vaporizable at the temperature of the nitrating reaction, the amount of said hydrocarbon being sufficient to remove water present in the mixture and that evolved by the reaction, agitating and heating the mixture to nitrate said toluene and vaporize the azeotrope until the water present and evolved by the reaction is substantially removed and crystallizing out the trinitrotoluene from the remaining solution.

VAMAN R. KOKATNUR.

REFERENCES CITED

The following references are of record in the file of this patent:

UNITED STATES PATENTS

| Number | Name | Date |
| --- | --- | --- |
| 1,210,725 | Tyrer | Jan. 2, 1917 |
| 1,908,523 | Malm | May 9, 1933 |
| 1,967,551 | Crawford | July 24, 1934 |
| 1,973,559 | Brown | Sept. 11, 1934 |
| 1,980,537 | Lange | Nov. 13, 1934 |
| 2,150,557 | MacMullen | Mar. 14, 1939 |
| 2,209,150 | Byrns | July 23, 1940 |
| 2,225,564 | Le Maistre | Dec. 17, 1940 |
| 2,243,471 | Olin | May 27, 1941 |
| 2,256,999 | Castner | Sept. 23, 1941 |

FOREIGN PATENTS

| Number | Country | Date |
| --- | --- | --- |
| 360,394 | Great Britain | 1930 |